March 27, 1962  J. G. SAMARA  3,027,261
PACKAGING AND RECONSTITUTING FOOD PRODUCTS
Filed Feb. 21, 1957

INVENTOR.
Jake G. Samara
BY
ATTORNEY.

United States Patent Office 3,027,261
Patented Mar. 27, 1962

3,027,261
PACKAGING AND RECONSTITUTING
FOOD PRODUCTS
Jake G. Samara, 633 NE. 23rd St., Oklahoma City, Okla.
Filed Feb. 21, 1957, Ser. No. 641,586
2 Claims. (Cl. 99—171)

This invention relates to the packaging and preparing for eating of certain food products and refers more particularly to an improved method of preparing such foods for eating and to a package having special utility in connection with said method.

Heretofore there has been considerable interest in packaging frozen food products in bags or envelopes which can be utilized as containers for the product during the preparation of the product for eating, that is, during the reconstituting or heating operation. For example, frozen shrimp has been packaged in sealed aluminum foil bags which can be tossed intact into a pan or caldron of boiling water with the seal unbroken and left there until the contents have thawed and been heated to eating temperature. This is also true of many other products which lend themselves to such a procedure. The advantages of such packages are many. By using such packages the householder or consumer can bring the product to the desired condition for eating without soiling to any great extent the pan or other receptacle in which the package is placed. The original package serves to substantially confine the food product and need not be opened until such time as the food is ready for serving. Also, the distribution of heat uniformly through the product as well as retention of the moisture therein is promoted. The confining walls of the package prevent in most cases excess steam or vapor losses.

However, there are serious drawbacks in the use of this arrangement where the packaged food product is one which contains a sauce or other condiment or is one which might be damaged or made less desirable or edible should the contents be exposed to direct contact with the liquid in which it is being heated. Sealed packages such as are presently used for shrimp, when placed in the heated liquid and maintained there for the length of time necessary to completely cook or reconstitute the product, are likely to burst or separate along the sealed edges due to the generation of gas pressures within the package. This results in ingress of the liquid to the interior of the package and also permits at the same time in such packages as may contain it, egress of the sauce or condiment. When the packaged food is one like shrimp, there is no particular objection to the entry of the water in which it is cooked. However, it cannot be tolerated in those packages which contain sauces and the like in which the water will dilute to an undesirable extent certain components of the mixture or render the entire contents unfit for eating, and in which the punctures or breaks in the package would permit the seep of the contents into the water or other liquid in which it is cooked.

It is an object of the present invention to provide a method of packaging and preparing for eating foods of the character described, such method obviating any danger of intermixing of the food product and the liquid heating medium while still permitting release of the gas pressure created by the heating of the food product.

A further object of the invention is to provide a food package capable of being stored in compact form, but having means thereon operable to be extended to form a gas escape passageway which, when the main body of the package is immersed in a heating liquid, extends above the level of the liquid and communicates directly with the atmosphere.

Another object of the invention is to provide a package of the character described which is extremely simple in construction and easily prepared for the heating operation.

A further object of the invention is to provide a food package of the character described in which the contents of the package are normally effectively sealed from contact with the atmosphere, one in which when the package is conditioned for the heating operation the seal can be easily broken by the gas pressure generated within the package and in which such gases are conducted away without permitting ingress of the heating liquid to the interior of the package.

Still another object of the invention is to provide a package having the extensible gas passageway described above, the gas passageway structure being self-supporting in the extended position and providing a handle means for manipulation of the package.

Other and further objects of the invention together with the features of novelty appurtenant thereto will appear in the course of the following description.

In the accompanying drawing which forms a part of the specification and is to be read in conjunction therewith and in which like reference numerals indicate like parts in the various views.

Figure 1:
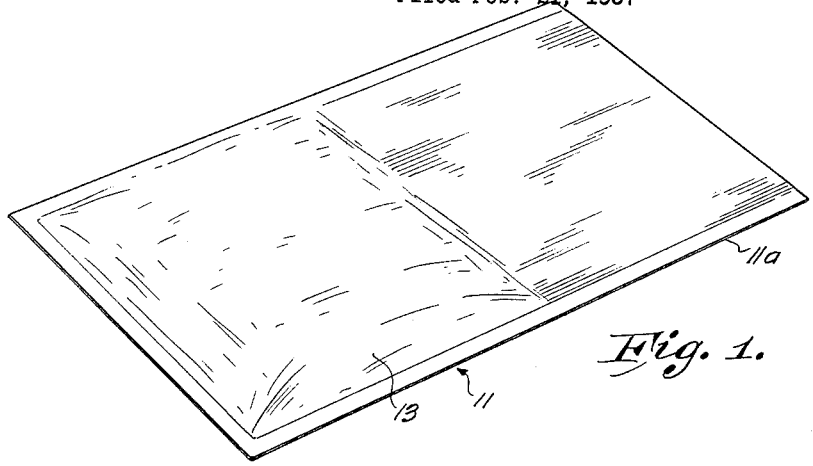
FIG. 1 is a perspective view of a preferred package according to my invention, the package being shown just subsequent to insertion of the food product and following flattening of the extension.

Referring to the drawings, reference numeral 10 indicates generally a frozen product such as spaghetti which has mixed with it a sauce or other condiment. In the preferred form of the invention the spaghetti is cooked and mixed with the sauce and then quick frozen in the usual fashion. Prior to freezing it is enclosed in the envelope-like container which is indicated at 11, although it may in some instances be advantageous to first freeze the food and subsequently enclose it in the container.

As is shown, the container is preferably a two ply envelope having plies 12 and 13 of rectangular shape. Preferably the container is fabricated from sheets of aluminum foil which are placed back to back and which are joined around three edges to form an open end envelope. Any means of joining the edges may be employed, the preferred method being the application of sufficient heat and pressure to result in fusion of the marginal portions of the sheets.

The capacity of the envelope 11 is made such that when the desired quantity of the food product is placed therein it will occupy only a fractional portion of the envelope, leaving an unfilled extension 11a which conveniently may be made the same length as the filled portion of the envelope or somewhat shorter. When the food product has been placed in the envelope through the open end of the extension 11a, this extension is again flattened so that the two plies of the envelope contact one another in the extension area.

Figure 3:
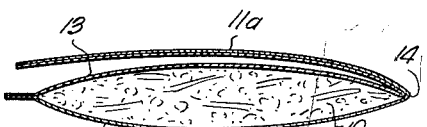
FIG. 3 is a view taken along the line 4—4 of FIG. 2 in the direction of the arrows.
Figure 2:
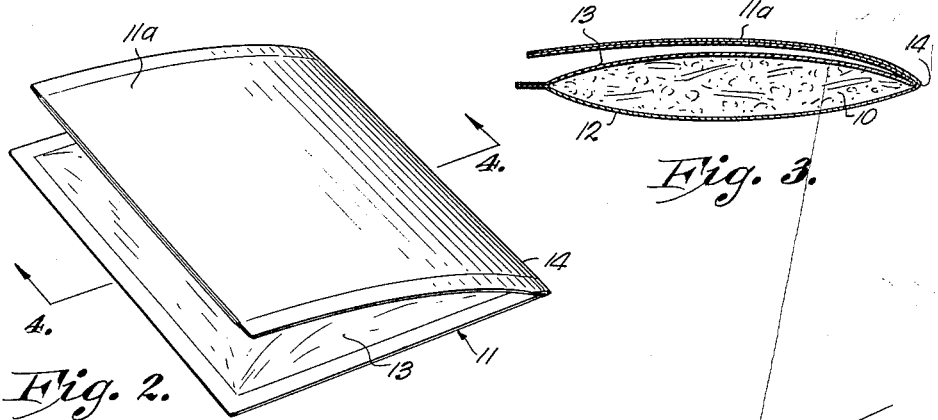
FIG. 2 is a perspective view of a preferred package showing the extension folded back over the filled portion and in condition for shipping and storing.

Following the placing of the food product in the envelope and the flattening of the extension 11a, the extension is then folded back over the filled portion of the envelope to form a fold line 14 (see FIGS. 2 and 3). I have found that the seal formed by folding is sufficient to completely protect the contents during ordinary handling and shipping. If desired, however, an additional removable seal (such as a pressure sensitive tape) may be applied to the open end of the envelope, but my experience has been that this is not necessary. In any event, any additional seal must be of a character such that it can be removed to permit free escape of gases from within the container at a subsequent point in the operation to be hereinafter described.

Figure 4:
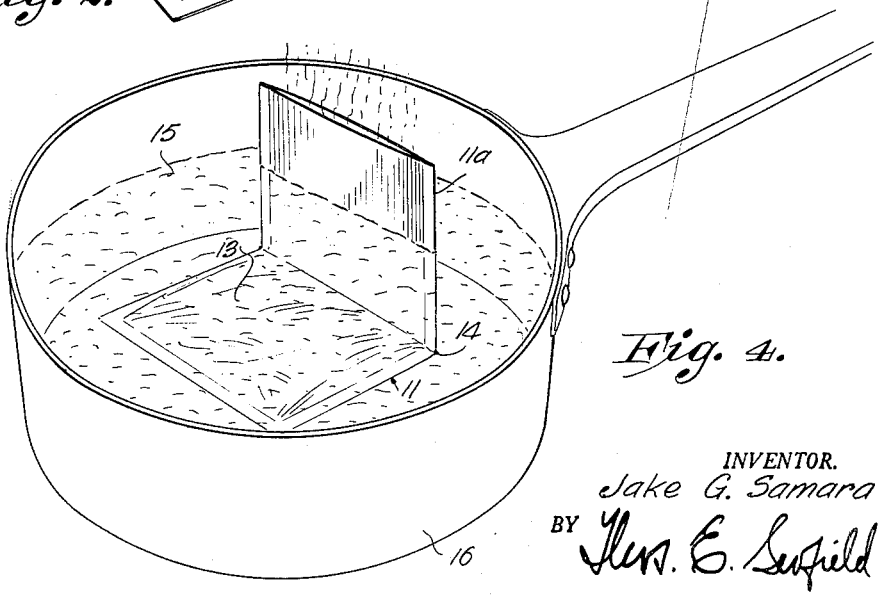
FIG. 4 is a perspective view of a preferred package as it appears when placed in a pan of water or other liquid with the package in proper condition for heating of the contents.

The package in the condition illustrated in FIGS. 3 and 4, that is, with the extension 11a folded, is ready for shipping and handling. If desired, it may be covered with an over wrap (not shown) or placed in a shipping carton (also not shown). Neither of these, however, form any part of the invention and would be supplied only as a means for more attractively packaging the basic envelope.

When it is desired to reconstitute the contents of the package, the following procedure is practiced. As shown in FIG. 4, extension 11a is bent or unfolded sufficiently to cause it to extend transversely from the filled portion. Since I employ aluminum foil for the composition of the envelope, the extension will remain in this position, aluminum foil having the property of being easily bent or deformed and of remaining in the condition to which it is bent or deformed. The filled portion of the envelope is then immersed in a suitable liquid, such as water 15, which may be contained in any suitable receptacle, for example pan 16. Care should be taken to see that the free end of extension 11a is well above the level of liquid, a desirable spacing being in the neighborhood of two inches.

Heat is applied to the liquid in any suitable manner, such as by placing the pan on the burner of a stove (not shown). As the contents of the package thaw and are raised in temperature, gases are generated within the envelope in sufficient volume to expand the filled portion of the envelope to the limits of its maximum volume. Once the filled portion is fully expanded, the gas pressure will cause the plies of the envelope along fold line 14 and in the extension 11a to separate sufficiently to form escape paths to the free end of the extension. As a result, there is no danger of the envelope developing punctures or tears below the liquid level line as the gases are generated and expanded during heating. The contact seal formed by the fold line 14 and by the contacting areas of the extension will be broken long before sufficient pressure can be generated to rupture the package along its sealed edges or at some point in the wall. The gases thus flow through the extension and are discharged above the level of the liquid. Consequently there is no possibility of dilution of the sauce or condiment or addition to the contents of undesirable moisture. The contents are effectively protected at all times from contact with the heating medium in which the package is immersed.

When heating is completed the package can then be removed with ease and facility by merely grasping the upper end of the extension and lifting it free of the liquid. The plies of the extension 11a are then further separated by any suitable means, either by the hands alone or by insertion of a table knife or other instrument to permit pouring of the contents therefrom on a plate or dish that they can be eaten.

From the foregoing it will be evident that I have accomplished all of the ends and objects hereinbefore set forth. While I have selected an aluminum foil as the preferred composition of the envelope, it will be evident that other sheet materials and alloys will serve the purpose equally well, the primary requirement being that the material be easily deformable, yet having sufficient inherent strength that the extension 11a will be self-supporting when bent traverse the filled portion. It will also be evident that the extension 11a can be folded more than once or can be fold rolled, the primary object being to reduce the extension to a position in which it merges compactly with the filled portion of the package to save space for shipping and storage and to make sure that there is a breakable contact seal between the plies of the extension until such time as the contents are to be prepared for eating.

While I have referred specifically to spaghetti, it will be understood that the package and method of preparing the food is readily adaptable for use with a wide variety of other food products where it is desired to prevent escape of the gases directly into the heating medium or to prevent direct contact of the latter with the contents.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A food package for foods which are capable of being reconstituted for consumer use by immersion of the package in a container having water therein to a predetermined level and heating the water, comprising an elongate, substantially flat sided envelope unsealed at one end, a food product disposed within said envelope, the quantity of said food product in relation to the capacity of said envelope being such that the food product only partially fills the envelope, leaving an unfilled extension terminating in said open end, said extension flattened to contact the opposed sides thereof with one another and folded back over and closely adjacent the filled portion and forming a fold line which provides a contact seal normally sealing the contents from the atmosphere, said extension being of such length that when the package is immersed in the liquid with the filled portion fully immersed in the liquid and on its side in the bottom of the container, the extension can be partially unfolded so that the extension projects transversely from the filled portion and above the surface of the liquid with the open end in direct communication with the atmosphere, the material of which said envelope is formed having sufficient rigidity to cause the extension to remain in said partially unfolded position without other support while still permitting, as heat is supplied, the separation of the sides of the extension and formation under the influence of expanding gases within the filled portion of gas escape passageways through the fold line and between the sides of the extension which communicate with said open end.

2. The method of reconstituting a food which is contained within a waterproof package formed of a pliable tubular envelope open at one end, the envelope of greater length than that required to contain the food and having the unfilled portion located adjacent said one end and folded against the filled portion, said method comprising the steps of unfolding the unfilled portion so that it extends away from the filled portion with the open end remote from the filled portion, depositing the filled portion in a quantity of water sufficient to immerse the filled portion and so arranging the unfilled portion that the open end projects above the level of the water, and applying heat to the water while the open end remains above the level of the water.

References Cited in the file of this patent

UNITED STATES PATENTS

| 2,380,134 | Waters | July 10, 1945 |
| 2,697,531 | Hood | Dec. 21, 1954 |
| 2,844,475 | Barnes et al. | July 22, 1958 |
| 2,858,970 | Barnes et al. | Nov. 4, 1958 |

FOREIGN PATENTS

| 661,820 | Great Britain | Nov. 28, 1951 |

OTHER REFERENCES

"Food Industries," July 1948, page 126.
"Home Canning," U.S. Dept. of Agr., pub., July 1947, pages 16 and 17.